United States Patent [19]

Nobusawa

[11] 4,058,816
[45] * Nov. 15, 1977

[54] CAMERA EXPOSURE CONTROL SYSTEM HAVING DIGITALLY CONTROLLED TIMING CIRCUITRY INCLUDING A DECIMAL COUNT STORING MEMORY

[75] Inventor: Tsukumo Nobusawa, Oizumi, Japan

[73] Assignee: Asahi Kogaku Kogyo Kabushiki Kaisha, Japan

[ * ] Notice: The portion of the term of this patent subsequent to July 13, 1993, has been disclaimed.

[21] Appl. No.: 632,195

[22] Filed: Nov. 17, 1975

[30] Foreign Application Priority Data

Nov. 26, 1974 Japan .............................. 49-136424
Aug. 15, 1975 Japan .............................. 50-98479

[51] Int. Cl.² ........................................... G03D 7/08
[52] U.S. Cl. .................................. 354/23 D; 354/43; 354/50; 354/60 A
[58] Field of Search ............. 354/23 D, 50, 51, 60 R, 354/60 A, 43, 44

[56] References Cited

U.S. PATENT DOCUMENTS

| | | | |
|---|---|---|---|
| 3,748,979 | 7/1973 | Wada | 354/23 D |
| 3,827,065 | 7/1974 | Wada | 354/23 D |
| 3,928,858 | 12/1975 | Sakurada et al. | 354/23 D |
| 3,969,735 | 7/1976 | Nobusawa | 354/23 D |

Primary Examiner—Russell E. Adams
Attorney, Agent, or Firm—Christie, Parker & Hale

[57] ABSTRACT

This invention provides apparatus for producing a command signal used to control the closing of a camera shutter. Before the shutter opens, a photo-responsive portion of the apparatus generates a number of serially occurring data pulses. After the shutter opens, a timing pulse generator portion produces a number of serially occurring timing pulses. A memory portion, including a plurality of registers, accumulates a decimal count of the serially occurring data pulses with each register storing a respective one of unit and higher decimal place portions of the decimal count. The memory forms part of a comparison circuit arrangement which responds to the data pulses and the timing pulses to produce the command signal.

1 Claim, 12 Drawing Figures

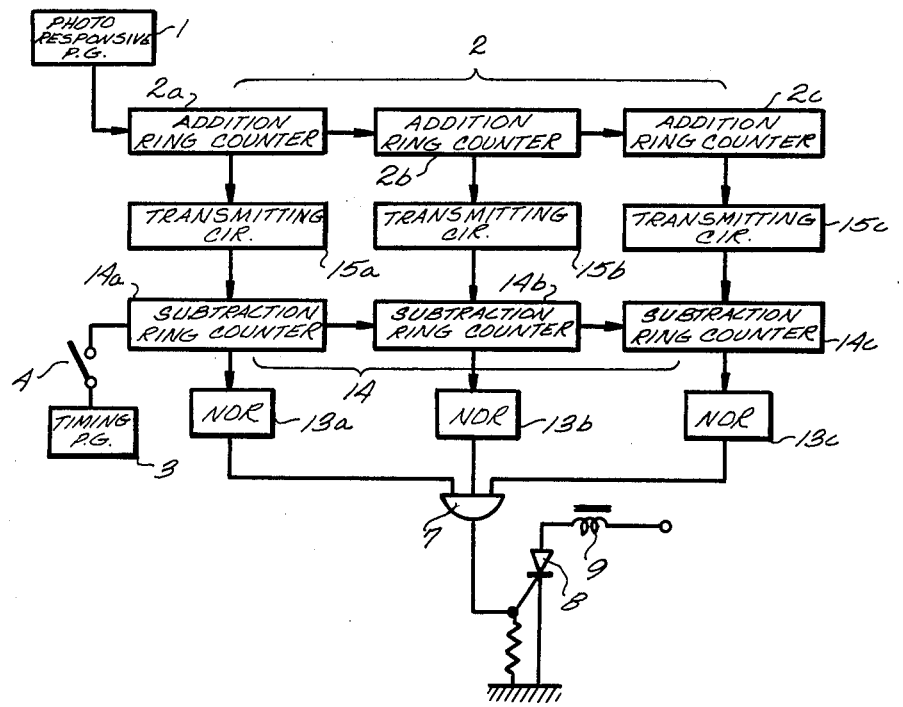
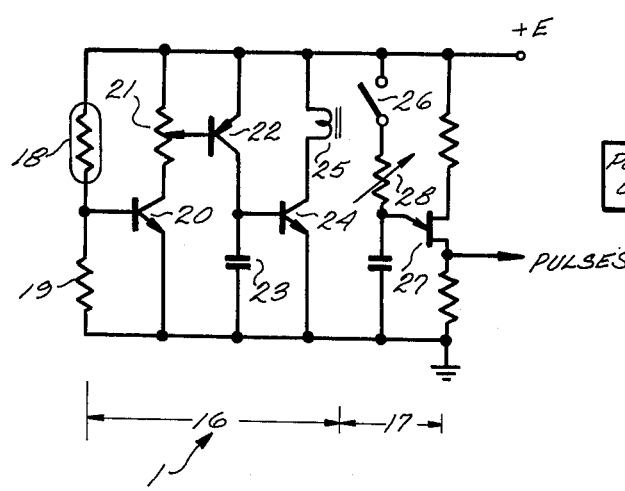
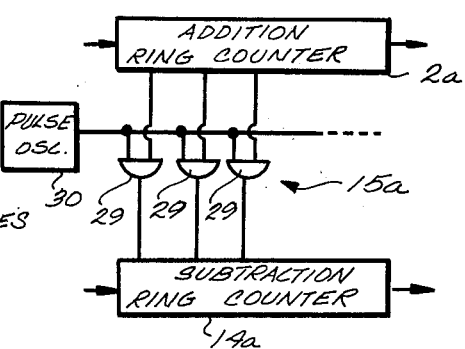

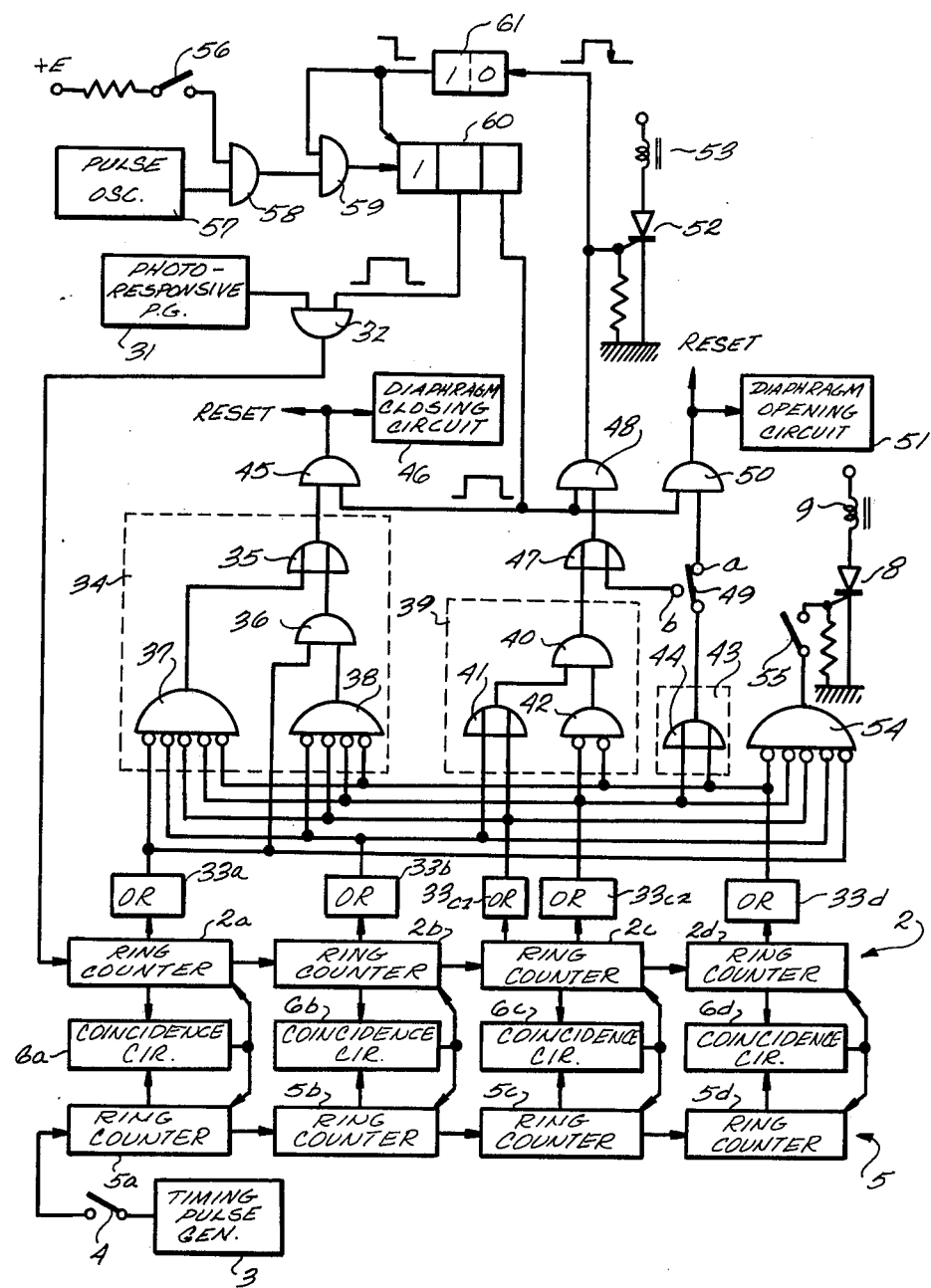

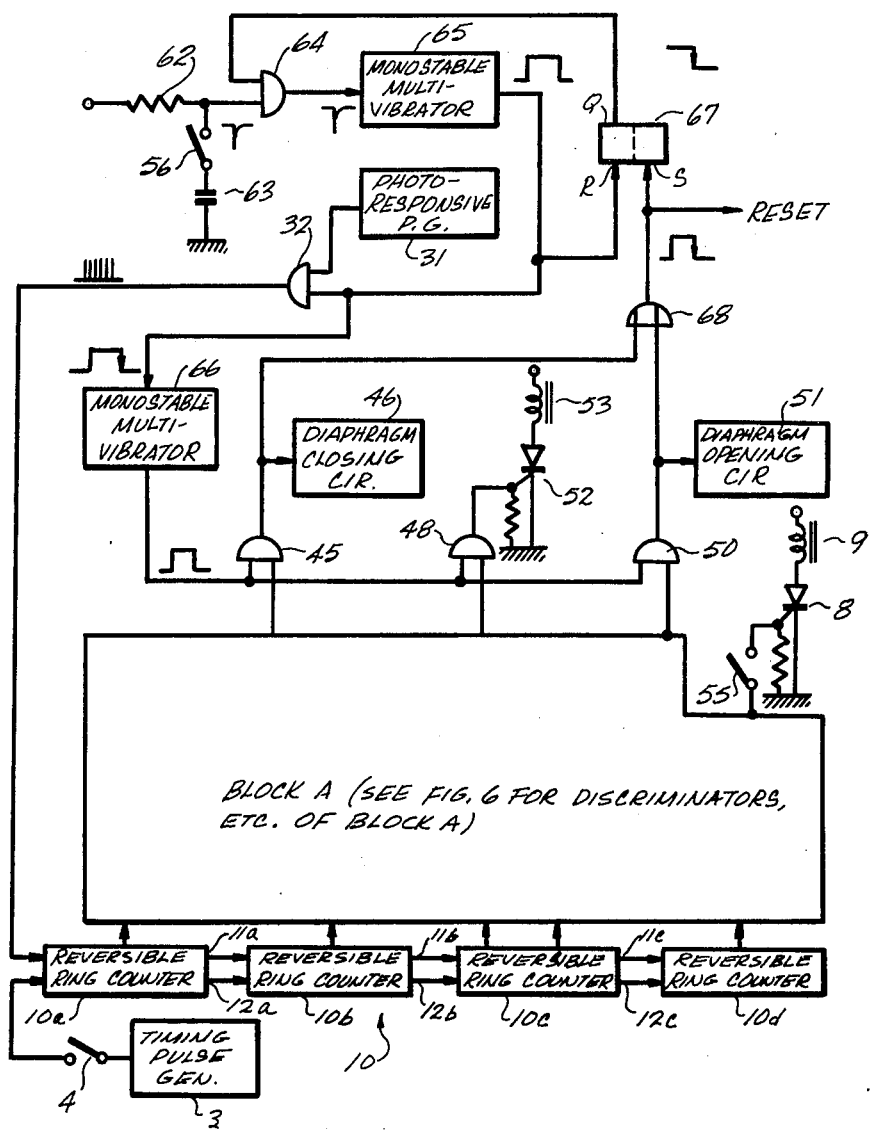

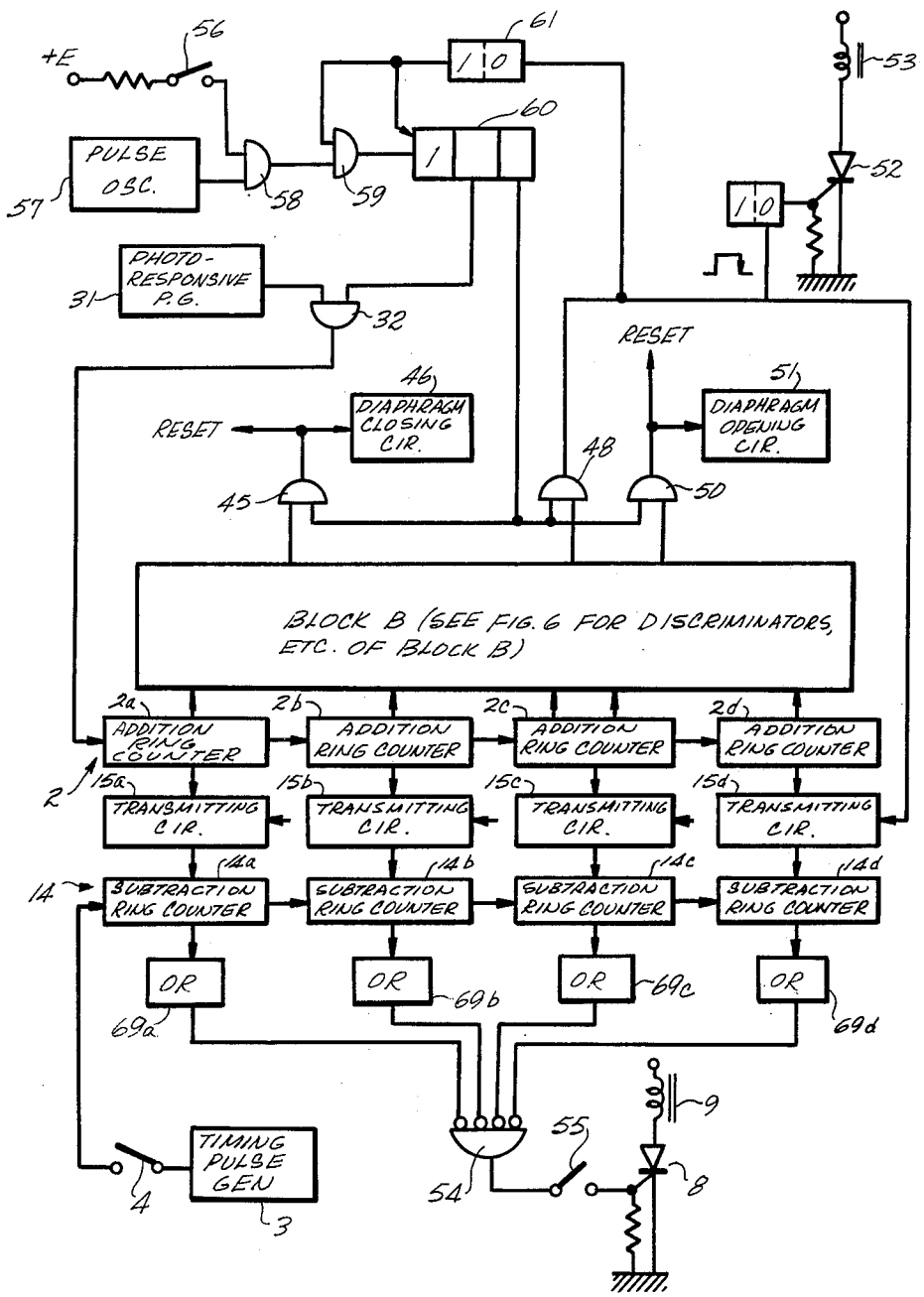

CAMERA EXPOSURE CONTROL SYSTEM HAVING DIGITALLY CONTROLLED TIMING CIRCUITRY INCLUDING A DECIMAL COUNT STORING MEMORY

BACKGROUND OF THE INVENTION

In general, this invention relates to camera exposure control systems. More particularly, it relates to a control system wherein there is provided digitally controlled timing circuitry including a decimal count storing memory.

A variety of different types of camera exposure control systems are known in the art. One type which has previously been proposed involves a digital approach to timing the closing of the camera shutter. According to this previously proposed approach, a number of data pulses are produced. The number of data pulses so produced is a function of the light intensity of an object to be photographed. The number of data pulses may also be a function of other photographic factors such as lens aperture setting and film sensitivity. Further according to this previously proposed approach, the data pulses are counted and stored in a digital memory.

Generally, the digital memories that have been proposed heretofore for this purpose provide for accumulating a binary count. Representative of such prior art digital memories are binary counter circuits and binary reversible (up/down) counter circuits. It has also been proposed to use a ring counter for the digital memory, with a separate memory element being provided for every stored data pulse.

Further according to this previously proposed approach, timing pulses commence to be generated upon the opening of the shutter. Then, when the number of timing pulses equals (or bears some other predetermined relationship to) the number of data pulses stored in the digital memory, a command signal is produced to effect closure of the shutter. Any one of a variety of comparison techniques may be used for comparing the timing pulses with the data pulses to detect this predetermined relationship. In any case, a longer exposure time is defined when more timing pulses occur before such detection, and a shorter exposure time is defined when fewer timing pulses occur before such detection. For a more detailed explanation of the foregoing and a disclosure of another of my inventions, reference is made to pending application U.S. Ser. No. 595,805, filed July 14, 1975, entitled CAMERA EXPOSURE CONTROL SYSTEM ADAPTED TO ADJUST BOTH THE DIAPHRAGM AND THE SHUTTER, which is assigned to the assignee of this invention.

It is desirable to control exposure time very precisely, and also to provide a display indicating the exposure time. This is especially so in connection with color photography. In particular, controlling exposure time in increments of 1LV will normally suffice where black-and-white film is used. However, when color film is used, it is desirable to control exposure time in increments as fine as 0.2 to 0.3 LV.

To achieve this more precise control, it is important to increase the scale factor or ratio according to which the number of data pulses varies relative to light intensity. In an arrangement where more data pulses are produced, it is necessary to increase the capacity of the digital memory. Memory capacity can be increased by providing a larger number of memory elements. However, to do this with previously proposed digital memories involves problems such as the following.

In circumstances where a binary counter circuit (inclusive of a binary reversible counter circuit) is used, an undesirably large number of decoder elements must be used in order to display the exposure time precisely. The resulting arrangement must therefore be complex. In other circumstances where a ring counter circuit or the like is used, a separate memory element has been required for every counted data pulse. Consequently, a very large number of memory elements must be used for precise control.

The digital memories described above have also been proposed for use in connection with a diaphragm preference type of exposure control system. There, an alarm is indicated in various circumstances. One way of indicating the alarm involves light emission of a display member arranged conveniently as in a viewfinder. Another way involves blocking the shutter release. Such an alarm is given when light intensity of a object to be photographed is too high to avoid an over-exposure. This circumstance of unacceptably high light intensity arises when the existing aperture setting admits so much light that overexposure is unavoidable even when the shutter operates at its highest shutter speed for the particular camera. Such an alarm is also given when the light intensity is too low to avoid a blurring of the photograph. This circumstance of unacceptably low light intensity arises when the existing aperture setting admits so little light that a very slow shutter speed is required for exposure and the long exposure time increases the risk of blurring incident to movement of the hands. With such an alarm system, however, it has inconveniently been necessary for the photographer to adjust the diaphragm manually.

As to what constitutes an acceptable exposure time, the following factors should be noted. One factor is the maximum available shutter speed for the particular camera. Another factor is the human one of how still the photographer can hold the camera. Still another factor is the compositional one of whether a large or small depth of field is desired. In general, one limit of acceptable exposure time is determined by the highest shutter speed available, and the opposite limit is determined by the susceptibility to blurring. Typically, where exposure time is in excess of 1/30 sec., blurring results from hand movements. Even when a tripod is used, however, limits are imposed because of film characteristics, particularly when color film is used.

SUMMARY OF THE INVENTION

This invention provides apparatus that overcomes the above-described problems and inconveniences. A distinguishing feature which plays an important role in the invention is an arrangement of a digital memory such that a decimal count is accumulated therein. Another such feature of the apparatus involves automatic diaphragm adjustment.

The apparatus of this invention is embodied in a camera having a shutter which opens to commence an exposure operation, and having electromechanical means responsive to a command signal to close the shutter. The apparatus includes photo-responsive pulse generator means for producing, during a first interval which precedes the opening of the shutter, a number of serially occurring data pulses. The number of data pulses so produced is a function of the light intensity of an object to be photographed. Timing-pulse generator means are included for producing, during a second interval which follows the opening of the shutter, a number of serially occurring timing pulses.

The apparatus further includes comparison circuit means which respond to the data pulses and the timing pulses to provide the command signal. This occurs when the number of timing pulses produced during the second interval bears a predetermined relationship to the number of data pulses produced during the first interval.

The comparison circuit means includes memory means for accumulating a decimal count of the serially occurring data pulses. The memory means comprises a plurality of registers each for storing a respective one of unit and higher decimal place portions of the decimal count. In one embodiment of the invention, each such register comprises a ring counter having ten memory elements, and the ring counters are connected in tandem so that a carry signal from a lower order ring counter increments the count in the next higher order ring counter. In another embodiment, reversible counters are used and thus both carry and borrow signals are used.

The comparison circuit means further includes gating circuit means, such as an AND gate, having an output on which the gating circuit means, when enabled, produces the command signal. The gating signal means has a plurality of inputs. Coupling means couple the inputs of the gating circuit means to respective registers of the memory means to enable the gating circuit means to produce the command signal.

Other distinguishing and advantageous features of the invention, which are recited in the appended claims, will be better understood after considering the detailed description given below together with the accompanying drawings.

BRIEF DESCRIPTION OF THE DRAWINGS

FIG. 3 is a block and schematic diagram which is similar to FIGS. 1 and 2, but which is directed to a third embodiment of this invention;

FIG. 4 is a schematic diagram of a specific photoresponsive pulse generator used in the embodiment of FIGS. 1-3;

FIG. 5 is a block diagram depicting the arrangement of a transmission circuit used in the embodiment of FIG. 3;

FIGS. 6, 7, and 8 are each a block and schematic diagram illustrating respective embodiments each of which provides an automatic diaphragm adjustment feature;

DETAILED DESCRIPTION

Figure 1:
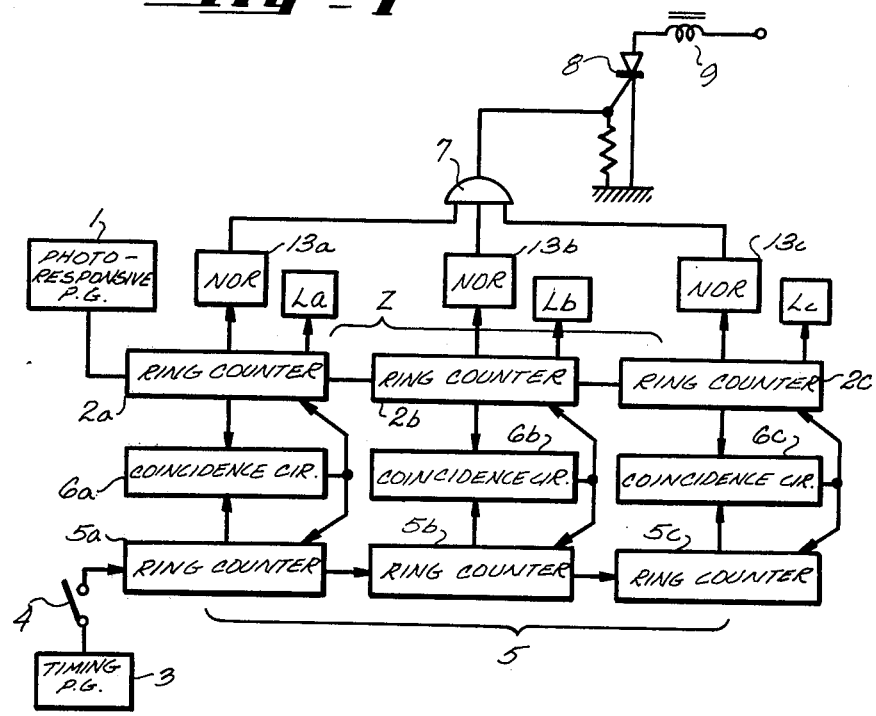
FIG. 1 is a block and schematic diagram depicting the general organization of a first embodiment of this invention.

The general organization of a first embodiment of this invention is depicted in FIG. 1. In this first embodiment, two counter circuits are used in an arrangement for effecting a comparison. One of these counter circuits serves as a digital memory for accumulating a decimal count of data pulses, and the other counter circuit counts timing pulses.

A photo-responsive pulse generator 1 produces a number of serially occurring data pulses. The number of data pulses so produced is a function of the light intensity of an object to be photographed. In this embodiment, the functional relationship between the number of data pulses and light intensity is an inverse or reciprocal relationship. More particularly, the number of data pulses so produced is proportional to a determination of exposure time made by photo-responsive pulse generator 1. The determination of exposure time takes into account factors such as diaphragm value and film sensitivity. A preferred embodiment of photo-responsive pulse generator 1 is depicted in FIG. 4 and will be described hereinafter.

Ring counter circuit units $2a$, $2b$, and $2c$ each comprise ten counter elements (not separately shown) connected with one another. These counter circuit units form a digital memory for accumulating a decimal count of the serially occuring data pulses. Ring counter circuit unit $2a$ provides storage of a value as to the unit's place portion of the decimal count. Ring counter circuit $2b$ provides storage of a value as to the ten's place. Ring counter circuit unit $2c$ provides storage of a value as to the hundred's place. Counter circuit 2 as a whole thus has a counting capacity corresponding to a range of 1 to 999 data pulses. As will be further explained, the exposure time storing capacity corresponds to an exposure-time range of 1 ms to 999 ms. It will be understood that the number of decimal place portions stored by counter circuit 2 may be increased, and thereby the range of the exposure time control may be correspondingly enlarged.

A plurality of display devices $La$, $Lb$, $Lc$ are provided to give an indication of the decimal count stored in counter circuit 2. Each display device comprises an element such as an electric lamp, a visual display tube, a fluorescent display tube, or a light-emitting diode.

A timing-pulse oscillator 3 produces a number of serially occurring timing pulses. It comprises, for example, a self-oscillation multivibrator which in this specific embodiment operates at a pulse repetition frequency of 1000 pulses per second. A switch 4 is operatively associated with elements such as shutter blades and is adapted to be closed at the same time the shutter opens to commence an exposure operation. Ring counter circuit units $5a$, $5b$, and $5c$ form a decimal counter circuit 5 which counts the timing pulses. A plurality of conventional coincidence circuit units $6a$, $6b$, and $6c$ are provided. Coincidence circuit unit $6a$ compares the count values of the counter circuit units $2a$ and $5a$ and, when the compared count values are the same, resets both of them. Coincidence circuit unit $6b$ is similarly adapted to compare the count values of counter circuit units $2b$ and $5b$, and to reset the counter circuit units when their count values coincide. Similarly, coincidence circuit unit $6c$ is adapted to effect this comparison as to counter circuit units 2c and 5c and to reset both of them when their count values coincide.

A thyristor 8 is connected to supply current to electromagnet 9 in response to a shutter-closing command signal. NOR gate units 13a, 13b, and 13c are coupled between the digital memory and the thyristor. Each NOR gate unit has its output terminal connected to provide an enable output to a respective input of a three-input AND gate 7. The characteristics of a NOR gate, it will be understood, are that it provides a "1" signal at its output when each of its inputs receives a "0" signal. When the respective counter circuit units 2a, 2b, and 2c are reset by coincidence circuit units 6a, 6b, and 6c, respectively, the command signal is produced in response to the enable outputs applied to AND gate 7 by NOR gate units 13a, 13b and 13c.

There will now be described the manner of operation of the apparatus described above. Upon depression of a release button (not shown) or the like, photo-responsive pulse generator 1 is activated. During a first interval of time, data pulses are serially generated by generator 1. The number of data pulses so produced is inversely proportional to the light intensity of a particular object to be photographed. The data pulses are counted and stored by decimal counter 2. The shutter time (i.e., exposure time) represented by the decimal count thus stored is displayed in decimal manner by display devices La, Lb, and Lc. During a second interval of time commencing at the same time the shutter opens, switch 4 is first closed and then the timing pulses generated by timing-pulse oscillator 3 are applied to decimal counter circuit 5. A comparison operation then ensues during which the number of timing pulses thus applied is compared with the number of stored data pulses. When there occurs coincidences of the count values between counter circuit units 2a and 5a, between counter circuit units 2b and 5b, and between counter circuit units 2c and 5c, respectively, coincidence circuit units 6a, 6b, and 6c simultaneously provide reset outputs which indirectly enable the command signal to be produced. In particular, because counter circuit units 2a, 2b, and 2c are reset, NOR gate units 13a, 13b, and 13c respond to directly provide outputs which enable AND gate 7 to turn on thyristor 8. Electromagnet 9 is thereby excited and serves to close the shutter.

The manner in which coincidence circuit units 6a, 6b, and 6c operate will now be described in detail. In an exemplary case in which decimal counter 2 counts, for example, five data pulses, ring counter 2a accumulates a decimal count of 5, whereas ring counters 2b and 2c each remain reset. Accordingly, NOR gate 13b and 13c provide their enabling outputs at the end of the first interval, but AND gate 7 does not at this point provide a command signal. When the shutter opens, application of the timing pulses begins. Upon application of five timing pulses during the second interval (i.e., 5 ms after the shutter opens), decimal counter 5 reaches the following state. The count value of ring counter 5a reaches 5 so that coincidence circuit unit 6a provides its output to reset the ring counters 2a and 5a. Thus, at this point, NOR gate 13a provides its enabling output and AND gate 7 responds by providing the command signal, resulting in closure of the shutter. As another example, assume that decimal counter 2 accumulates a count of 12 data pulses. Ring counter 2a will then store a count of 2, ring counter 2b will store a count of 1, and ring counter 2c will store a count of 0 (i.e., be reset). Consequently, only NOR gate 13c provides its enabling output but does not yet provide the command signal. Upon application of two timing pulses to decimal counter 5 after opening of the shutter, ring counter 5a accumulates a count of 2, so that coincidence circuit 6a resets ring counters 2a and 5a. Then, NOR gate 13a provides its enabling output. Upon application of ten more timing pulses to decimal counter 5, a carry signal from ring counter 5a is applied to ring counter 5b and, in consequence, the count value in counter 5b now becomes 1. Coincidence circuit 6b thereby resets ring counters 2b and 5b. Now NOR gate 13 provides its enabling output and accordingly AND gate 7 provides a command signal, resulting in closure of the shutter.

It will be understood from the foregoing description that AND gate 7 provides a shutter closing command signal when the count value of the decimal counter 2 coincides with the count value of the decimal counter 5. Prior to application of the pulses from photo-responsive pulse generator 1 to decimal counter 2, the count values of the respective ring counters 2a, 2b, and 2c are 0. These are of course the conditions under which NOR gates 13a, 13b, and 13c, and AND gate 7 operate to provide the command signal. To avoid prematurely producing the command signal, there may be provided a switch 55 as will be described more in detail hereinafter. Alternatively, an arrangement may be provided such that a source voltage is applied to the thyristor 8 upon completion of the pulse storage in detail counter 2.

Figure 2:
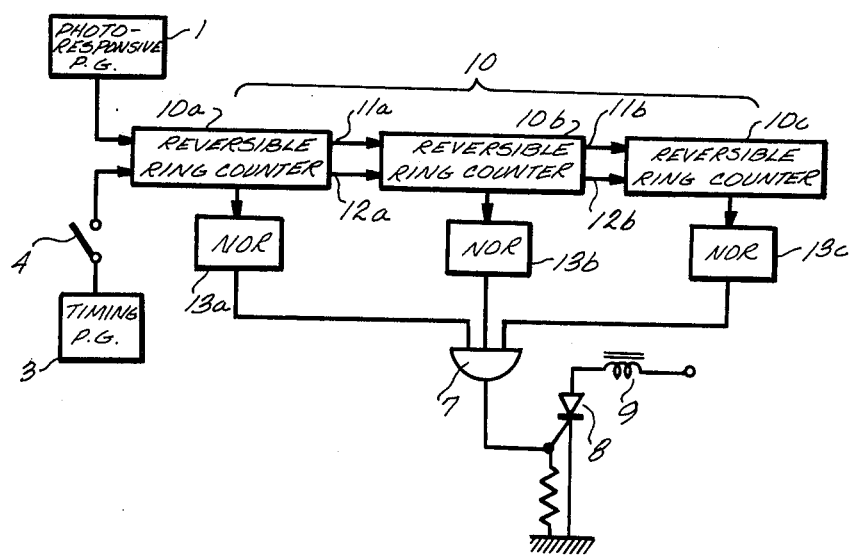
FIG. 2 is a block and schematic diagram which is similar to FIG. 1, but which is directed to a second embodiment of this invention.

FIG. 2 schematically illustrates the general organization of a second embodiment of this invention. In this embodiment, a common counter circuit counts both the data pulses and the timing pulses. Although not shown again in FIG. 2, display devices La, Lb and Lc may be provided also, just as in the embodiment described above in reference to FIG. 1.

A decimal reversible counter circuit 10 is provided in the embodiment of FIG. 2. It includes a reversible ring counter circuit unit 10a adapted to store the unit's place, a reversible ring counter circuit unit 10b adapted to store the ten's place and a reversible ring counter unit 10c adapted to store the hundred's place. Each reversible ring counter circuit unit includes 10 counter elements connected to one another. Data pulses generated by the photo-responsive pulse oscillator 1 are applied to an addition input of ring counter circuit unit 10a. A carry signal (CARRY) 11a is generated as a result of addition effected by ring counter circuit unit 10a. The carry signal is applied to an addition input of the following ring counter circuit unit 10b. Similarly, a carry signal 11b generated as a result of addition effected by ring counter circuit unit 10b is applied to an addition input of the following ring counter circuit unit 10c. On the other hand, the timing pulses generated by timing-pulse oscillator 3 are applied to a subtraction input of ring counter circuit unit 10a. A borrow signal (BORROW) 12a is generated as a result of subtraction effected by ring counter circuit unit 10a. This borrow signal is applied to a subtraction input of the following ring counter circuit unit 10b. Similarly, a borrow signal 12b is generated as a result of subtraction effected by ring counter circuit unit 10b, and is applied to a subtraction input of the following ring counter circuit unit 10c. NOR gate units 13a, 13b, and 13c provide respective enabling outputs when the respective ring counter circuit units 10a, 10b, and 10c count "0".

In the arrangement of FIG. 2, the data pulses which serially occur during a first interval are applied to and accumulated by decimal counter circuit 10 as addition pulses. Then, during a second interval sequencing with the opening of the shutter timing pulses are applied to decimal counter circuit 10 as subtraction pulses. When the number of these timing pulses coincides with the number of the stored data pulses, decimal counter circuit 10 counts "0" and the outputs of the NOR circuit units 13a, 13b and 13c all correspond to "1". Consequently, thyristor 8 is turned on by the output from AND gate 7, and shutter closure is effected.

FIG. 3 schematically illustrates the general organization of a third embodiment of this invention. In this embodiment, there are provided an addition ring counter circuit and a subtraction ring counter circuit. Addition ring counter circuit 2 comprises units 2a, 2b, and 2c. Subtraction ring counter 14 comprises units 14a, 14b, and 14c. A group of transmitting circuit units 15a, 15b, and 15c are adapted to transmit count values of the respective ring counter circuit units 2a, 2b, and 2c to the subtraction ring counter circuit units 14a, 14b, and 14c, respectively. These transmitting circuit units are of well known art as, for example, illustrated in FIG. 5.

In this third embodiment, the data pulses generated by the photo-responsive pulse oscillator 1 are stored in decimal counter circuit 2. The count values of the respective counter circuit units 2a, 2b, and 2c are then transmitted to the corresponding subtraction ring counter circuit units 14a, 14b, and 14c and stored therein. In synchronization with opening of the shutter, the comparison pulses are applied to decimal subtraction counter circuit 14 to initiate subtraction and the shutter closure is effected when the count value reaches "0".

FIG. 4 is a circuit diagram illustrating in more detail photo-responsive pulse generator 1. A timer circuit 16 is provided, the timing of which is dependent on a particular light intensity of an object to be photographed. A pulse oscillator 17 serves as the output stage of generator 1. In timer circuit 16, a CdS element 18 serves as a photoelectric converter element. It is exposed to light coming from the object to be photographed. A resistor 19 is connected to CdS element 18. A voltage is developed at the junction of CdS element 18 and resistance 19, and applied to a transistor 20. A variable resistor 21 is connected to the collector of transistor 20 and to the base of a transistor 22, and an inner resistance of transistor 22 is thereby varied as a function of light intensity. Transistor 22 and a capacitor 23 form a timer circuit adapted to control a switching transistor 24. An electromagnet 25 is adapted to open a switch 26 and thereby to stop oscillation of pulse oscillator 17. A unijunction transistor 27 and a variable resistor 28 are provided. Variable resistors 21 and 28 may be utilized to reckon exposure factors such as film sensitivity and diaphragm value.

FIG. 5 schematically illustrates the arrangement of the transmitting circuit 15a shown generally in FIG. 3. It comprises a plurality of AND gates 29, a separate one for each counter element in ring counter circuit unit 23a. It further includes a single pulse oscillator 30. A pulse generated from single pulse oscillator 30 is applied to the respective AND gates 29 and thereby the count value of the ring counter unit 2a is transferred to the ring counter circuit unit 14a.

With reference to FIG. 6, there will be described an embodiment of this invention which provides an advantageous feature relating to automatic adjustment of the diaphragm.

In FIG. 6, reference numeral 31 designates a photoresponsive pulse oscillator adapted to generate data pulses at a frequency which is a function of an exposure time determined according to light intensity of an object to be photographed, diaphragm value and film sensitivity. A detailed description of pulse oscillator 31 will be given hereinafter in reference to FIG. 9. The data pulses are coupled through an AND gate 32 which is adapted to be opened for a predetermined time. This means that the number of data pulses thus coupled through the AND gate 32 is proportional to a particular exposure time. In the embodiment of FIG. 6, a separate data pulse is applied for every 0.1 millisecond increment of exposure time.

A decimal counter 2 is adapted to count the number of data pulses coupled thereto from AND gate 32. Decimal counter 2 comprises ring counters 2a, 2b, 2c and 2d. Each ring counter includes ten counter elements connected to one another. Ring counter 2a is adapted to store the unit's place, ring counter 2b is adapted to store the ten's place, ring counter 2c is adapted to store the hundred's place, and ring counter 2d is adapted to store the thousand's place. Accordingly, decimal counter 2 may count 1 to 9999 pulses or store the exposure time of 0.1 millisecond to 9999 milliseconds. The exposure time stored in decimal counter 2 may be displayed by associating display devices with the ring counters 2a, 2b, 2c, and 2d.

Another decimal counter 5 is adapted to count the number of timing pulses generated from timing-pulse oscillator 3, which includes ring counters 5a, 5b, 5c, and 5d, which are similar to those previously described.

Coincidence circuits 6a, 6b, 6c, and 6d are adapted to compare the count values of the corresponding pair of counters and to reset the corresponding pair of counters when the coincidence is established, respectively. Reference numerals 33a, 33b, 33c1, 33c2, and 33d designate OR gates. OR gates 33c1 is adapted to provide its output "1" when the corresponding counter 2c counts 1 or 2. OR gate 33c2 is adapted to provide its output "1" when the corresponding counter 2c counts 3 to 9. Reference numeral 34 designates a discriminator comprising an OR gate 35, an AND gate 36 and NOR gates 37 and 38. Discriminator 34 is adapted to provide its output "1" when the count value of the decimal counter 2 is 8 or less. It will be understood that discriminator 34 provides its output "1" when every OR gate 33a to 33d provides the output "0" or when only the OR gate 33a provides its output "1" the remaining OR gates provide their outputs "0". Reference numeral 39 designates another discriminator comprising an AND gate 40, an OR gate 41 and a NOR gate 42 and adapted to provide its output "1" when the decimal counter 2 counts 10 to 299. Discriminator 19 provides its output "1" when at least one of the OR gates 33b and 33c1 provides its output "1" and both the OR gates 33c2 and 33d provide their outputs "0". Reference numeral 43 designates still another discriminator comprising an OR gate 44. Discriminator 43 is adapted to provide its output "1" when the decimal counter 2 counts 300 or more. Discriminator 43 provides its output "1" when at least one of the OR gates 33c2 and 33d provides its output "1".

The manner in which discriminators 34, 39 and 43 operate will now be described. For the count value of decimal counter 2 less than 9 (i.e., less than 0.9 ms as converted into exposure time), discriminator 34 provides its output "1". For the count value of decimal counter 2 between 10 and 299 (i.e., between 1 ms and 29.2 ms as converted into exposure time), discriminator 39 provides its output "1". Finally, for the count value of decimal counter 2 more than 299 (i.e., 30 ms or more as converted into exposure time), discriminator 43 provides its output.

The "1" output from the discriminator 34 is applied through an AND gate 45 to a diaphragm closing circuit 46 and simultaneously resets decimal counter 2. Diaphragm closing circuit 46 comprises a diaphragm driving mechanism such as a pulse motor or a digital-analog converter associated with a servomotor and is adapted to stop the diaphragm down to a predetermined extent with the output from AND gate 45. The output from discriminator 39 is applied through an OR gate 47 and an AND gate 48 to a sequence control circuit as will be described more in detail and to a thyristor 52 serving as a switching element for opening of the shutter. Reference numeral 53 designates an electromagnet for opening of the shutter. The output from discriminator 43 is applied through a switch 49 and an AND gate 50 to a diaphragm opening circuit 51 and simultaneously resets the decimal counter 2. The diaphragm opening circuit 51 is a mechanism similar to diaphragm closing circuit 46 except that the former is adapted to open the diaphragm to a predetermined extent. The switch 49 may be changed over by the photographer when it is desired to carry out photographing with an exposure time longer than 30 ms. When this switch 49 is changed over to the b side, the output of discriminator 43 is applied to OR gate 47. Reference numeral 54 designates a NOR gate adapted to provide its output "1" when every one of the OR gates 33a, 33b, 33c1, 33c2, and 33d provides its output "0". That is, when the count value of decimal counter 2 is "0". Reference numeral 55 designates a switch adapted to be closed in operative association with switch 4 for prevention of erroneous operation of a thyristor 8. The count value of decimal counter 2 remains "0" before the data pulses generated by photoresponsive pulse oscillator 31 have been stored by decimal counter 2 and, accordingly, NOR gate 54 is now providing its output "1" by which thyristor 8 would be otherwise turned ON.

Reference numeral 56 designates a switch operatively associated with a release button, which is adapted to be closed upon depression of the release button. When closed it applies a "1" output to an AND gate 58. Reference numeral 57 designates a pulse oscillator for sequence control which may be a well known multivibrator of self-excitation type. Reference numeral 60 designates a ring counter for sequence control adapted to be applied through AND gate 58 and an AND gate 59 with sequence control pulses coupled from pulse oscillator 57. Ring counter 60 opens AND gate 32 upon application of the first control pulse, applies a signal to AND gates 45, 48 and 50 upon application of the second control pulse, and restores the illustrated position upon application of the third control pulse of the sequence control pulses from pulse oscillator 57. Such an operation of ring counter 60 is repeated so far as applied with the sequence control pulses. Reference numeral 61 designates an RS flip-flop normally at the illustrated position, applying "1" output to AND gate 59, but reversed by a pulse output from AND gate 48 to close AND gate 59 and to reset ring counter 60 in preparation for the subsequent photographing.

The manner in which this embodiment of automatic exposure time control circuit operates will now be described. Depression of the release button after setting of diaphragm value and film sensitivity causes switch 56 to close. The sequence control pulses from pulse oscillator 57 are now applied to ring counter 60. AND gate 32 remains opened for a time elapsing from the first control pulse to the second control pulse of these sequence control pulses so that the data pulses of the number proportional to an exposure time determined according to the light intensity of an object to be photographed, the present diaphragm value and the film sensitivity are applied to and counted by decimal counter 2.

When the count value of decimal counter 2 is, for example 5 (i.e., 0.5 ms as converted into exposure time), only OR gate 33a provided its output "1". Thus discriminator 34 provides its "1" output, and applies a signal to AND gate 45. Each of the gates 45, 48, and 50 is applied with a signal for a time elapsing from the moment at which ring counter 60 has been applied with the second control pulse to the moment at which ring counter 60 is applied with the third control pulse. As a result, only AND gate 45 provides its output. This output activates diaphragm closing circuit 46 so as to stop at a moment the diaphragm to a predetermined extent. Also decimal counter 2 is reset in preparation for the subsequent counting. Ring counter 60 restores the illustrated position upon application with the third control pulse and AND gate 32 is opened again by the fourth control pulse. Now another stream of data pulses are provided. In particular, the number of succeeding data pulses is proportional to an exposure time determined by the adjusted diaphragm value are applied to and counted by decimal counter 2. For the number of data pulses being less than 9, the process as previously mentioned is repeated again. Assuming that the count value of decimal counter 2 reaches, for example 12 (i.e., 1.2 ms as converted into exposure time), OR gates 33a and 33b provide their outputs "1" so that discriminator 39 provides "1" output which is, in turn, applied to AND gate 48 and provides its output, turning thyristor 52 ON to open the shutter, reversing RS flip-flop 61 to reset ring counter 60 and simultaneously closing AND gate 59. Switches 4 and 55 are closed in synchronization with the opening of the shutter. Then the timing pulses generated by pulse oscillator 3 are applied to decimal counter 5. When decimal counter 5 is applied with two timing pulses, coincidence circuit 6a provides its output by which counters 2a and 5a are reset. The output of OR gate 33a now returns to "0". When decimal counter 5 is applied with 10 timing pulses, coincidence circuit 6b provides its output by which counters 2b and 5b are reset. The output of OR gate 33b returns to "0". all the outputs of OR gates 33a to 33d thereby return to "0" and NOR gate 54 provides its output by which thyristor 8 is turned ON to close the shutter. This corresponds to an exposure time of 1.2 ms.

Assuming that the count value of decimal counter 2 is, for example, 500 (i.e., 50 ms as converted into exposure time), only OR gate 33c2 provides its output "1". Thus, discriminator 43 provides "1" output which is applied through switch 49 to AND gate 50. When applied with the signal from ring counter 60, AND gate 50 provides its output by which diaphragm opening circuit 51 is activated to open the diaphragm to a predetermined extent and to reset decimal counter 2 in preparation for subsequent counting. It will be understood that the process as previously described is repeated before the count value of decimal counter 2 decreases to a value less than 299. When the counter value of decimal counter 2 decreases to a value less than 299, discriminator 39 provides its output so that opening and closure of the shutter are automatically effected in the same manner as previously described. In this embodiment, the diaphragm value is automatically adjusted when the exposure time stored in decimal counter 2 is out of the range between 1 ms and 29.9 ms and opening and closure of the shutter is automatically effected only when the exposure time is within said range of exposure time. Therefore, it is possible to prevent unintentional overexposure and blurring incident to movement of the hands. When photographing is carried out with a photographic camera fixed on a tripod so that there is no danger of said hand movement, switch 49 may be changed over to the b side to effect photographing with an exposure time longer than 30 ms.

FIG. 7 illustrates another embodiment of the present invention in which a reversible counter is employed as the decimal counter and there is provided a monostable multivibrator for sequence control. Referring to FIG. 7, a block A generally designates the discriminators 34, 39 and 43, the OR gate 47, the switch 49, the NOR gate 54 and the OR gates 33a to 33d so as to simplify illustration. Reference numeral 10 designates a reversible decimal counter comprising a reversible ring counter 10a adapted to store the unit's place, ring counter 10b adapted to store the ten's place, a ring counter 10c adapted to store the hundred's place and a ring counter 10d adapted to store the thousand's place. Pulses generated from photo-responsive pulse oscillator 31 are applied through AND gate 32 to an addition input of ring counter 10a as data pulses. An addition carry signal (CARRY) 11a from ring counter 10a is applied to ring counter 10b as addition input. Similarly, an addition carry signal 11b from ring counter 10b is then applied to ring counter 10c, and an addition carry signal 11c from ring counter 10c is applied to ring counter 10d as an addition input. The pulses generated from timing-pulse oscillator 3 are applied to the ring counter 10a as subtraction input. A subtraction borrow signal (BORROW) 12a from ring counter 10a is applied to ring counter 10b as subtraction input. Similarly, a subtraction borrow signal 12b is applied to ring counter 10c as subtraction input and a subtraction borrow signal 12c from ring counter 10c is applied to ring counter 10d as subtraction input. Reference numerals 62 and 63 designate a resistance and a capacitor, respectively, which constitute together a differentiation circuit adapted to apply a differentiation pulse through an AND gate 64 to a monostable multivibrator 65 upon closure of the switch 56 operatively associated with the release button. The multivibrator 65 provides its output "1" only for a predetermined time or fixed duration after receiving the differentiation pulse. This fixed-duration pulse output is applied to the AND gate 32, another monostable multivibrator 66 and an RS flip-flop 67. The multivibrator 66 is activated at a moment when the output of multivibrator 65 returns from "1" to "0" and then applies "1" output to AND gates 45, 48 and 50 only for a predetermined time. Reference numeral 68 designates an OR gate adapted to apply the pulse outputs from AND gates 45 and 50 to decimal counter 10 as a reset signal and simultaneously to RS flip-flop 67. RS flip-flop 67 normally occupies the position as illustrated and is applied at its R terminal with the output from multivibrator 65 and at its S terminal with the output from OR gate 68 and applies the Q output to AND gate 64.

The manner in which this embodiment of automatic exposure time control circuit operates will now be briefly described. Upon depression of the release button, switch 56 closes and thereby differentiation pulses are applied through AND gate 64 which is then being applied with "1" signal from RS flip-flop 67 to multivibrator 65. Multivibrator 65 enables a single data pulse from photo-responsive oscillator 31 to be applied to and be counted by decimal counter 10. The pulse from said multivibrator 65 is applied to the R terminal of the RS flip-flop 67, but there occurs no change in the output condition of RS flip-flop 67. The pulse from multivibrator 65 is applied further to multivibrator 66 which, in turn, provides a single pulse. When the count value of decimal counter 10 is, for example, 5, a signal is applied to AND gate 45 so that AND gate 45 provides a pulse because AND gate 45 is applied at its one input terminal with the pulse from multivibrator 66. This pulse is applied to diaphragm closing circuit 46, and is applied through OR gate 68 to decimal counter 10 so as to reset said counter 10, and to the S terminal of the RS flip-flop 67. RS flip-flop 67 is thereby reversed and the Q output becomes "0", so that AND gate 64 now provides "0" output. Consequently, multivibrator 65 is activated again to provide a single pulse which is then applied to the R terminal of RS flip-flop 67 and the latter restores the illustrated position in preparation for the subsequent reversion. The pulse from multivibrator 65 is applied to AND gate 32 and multivibrator 66. The pulses according to the adjusted diaphragm value are applied to and counted by decimal counter 10. The iterative process as previously described will be repeated when the count value of decimal counter 10 is less than 9, and the signal is applied to AND gate 48 when the count value of decimal counter 10 is 10 to 299, so that AND gate 48 will provide its output when applied with the pulse from multivibrator 66. Thyristor 52 is thereby turned ON and the shutter is opened. In synchronization with this opening of the shutter, switches 4 and 55 are closed, so that the timing pulses from timing-pulse oscillator 3 are applied to decimal counter 10 and its count value is subjected to subtraction. When the count value of decimal counter 10 decreases to "0", thyristor 8 is turned ON and the shutter is closed.

FIG. 8 illustrates still another embodiment of the present invention in which the reversible counter is replaced by an addition counter and a subtraction counter. A block B generally designates the discriminators 34, 39 and 43, the OR gate 47, the switch 49, and the OR gates 33a to 33d corresponding to those as illustrated by FIG. 6. Reference numeral 2 designates the decimal counter as previously mentioned. Reference numeral 14 designates a decimal subtraction counter comprising 10 counter elements in the form of subtraction ring counters 14a, 14b, 14c, and 14d connected to one another. This decimal subtraction counter 14 is adapted to count the timing pulses from the timing-pulse oscillator 3. Reference numerals 15a, 15b, 15c and 15d designate well-known transmission circuits which are so connected that the count values of the respective ring counters 2a, 2b, 2c, and 2d may be transmitted by these transmission circuits to the corresponding ring counters 14a, 14b, 14c, and 14d upon application of the output of AND gate 48. Reference numerals 69a, 69b, 69c, and 69d designate OR gates which provide "1" outputs, respectively, when the count values of the corresponding counters 40a, 40b, 40c, and 40d are respectively between 1 and 9. There is provided a circuit arrangement such that the outputs of OR gates 69a to 69d are applied to NOR gate 54 similar to that as previously described. Reference numeral 70 designates an RS flip-flop serving as a delay circuit adapted to turn thyristor 52 ON after the count value of decimal counter 2 has been transmitted to decimal counter 14 in response to the pulse from AND gate 48.

In this embodiment, an automatic adjustment of diaphragm value is effected as mentioned in connection with the embodiment of FIG. 6 when the number of pulses counted by the decimal counter 2 is not within a predetermined range. When the count value of the decimal counter 2 is within said predetermined range, on the other hand, AND gate provides its output which is, in turn, applied to transmission circuits 15a to 15d. The count value of decimal counter 2 is thereby transmitted to decimal counter 14. At the moment when the output of AND gate 48 returns to "0", flip-flop 70 is reversed and thyristor 52 is turned ON by the reversion output. Turning ON the thyristor 52 causes the shutter to be opened and simultaneously switches 4 and 55 are closed. The timing pulses from pulse oscillator 3 are applied to decimal counter 14 and the count value thereof is subjected to subtraction. When the count value of decimal counter 14 returns to "0", namely, the count values of the respective ring counters 14a to 14b return to "0", respectively, all the outputs of OR gates 69a to 69d become "0". Thyristor 8 is thereby turned ON and the shutter is closed.

Figure 9:
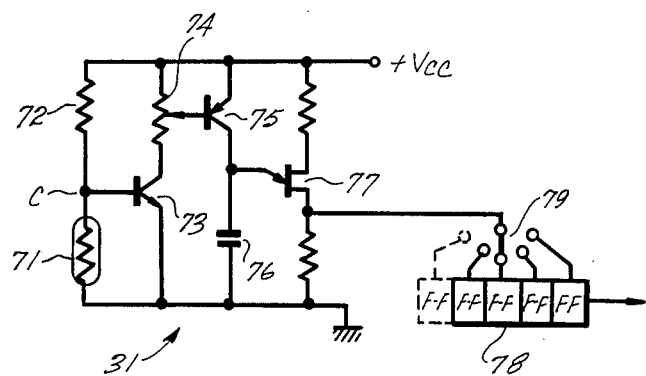
FIG. 9 is a schematic diagram of a photo-responsive pulse generator 31 used in the embodiments of FIGS. 6-8.

FIG. 9 illustrates a specific embodiment of photo-responsive pulse generator 31, in which a reference numeral 71 designates a CdS element adapted to be exposed to light coming from an object to be photographed. The CdS element may be replaced by an element such as a phototransistor. Reference numeral 72 designates a resistance, reference numeral 73 designates a transistor and reference numeral 74 designates a variable resistor which is utilized to reckon a preset diaphragm value or a film sensitivity. Reference numeral 75 designates a transistor of which the inner resistance is determined according to a voltage at a connection point C between CdS element 71 and resistance 72. Transistor 75, a capacitor 76 and a unijunction transistor 77 constitute together a pulse oscillator. Reference numeral 78 designates a frequency divider comprising multistage connected flip-flops and adapted to vary its frequency division ratio under control of a switch 79. This frequency divider also my be utilized to reckon a preset diaphragm value of a film sensitivity. Reckoning of a preset diaphragm value and a film sensitivity may be effected either by utilization of variable resistor 74 or of frequency divider 78. As the light intensity to which the CdS element 71 is exposed increases, the voltage at the connection point C drops and the collector current of transistor 73 decreases. Consequently, the base potential of transistor 75 with respect to the emitter thereof rises and the inner resistance of transistor 75 increases. The oscillation frequency of unijunction transistor 77 is thereby prolonged. Thus, the frequency of pulses applied from this circuit is inversely proportional to exposure time.

Figure 10:
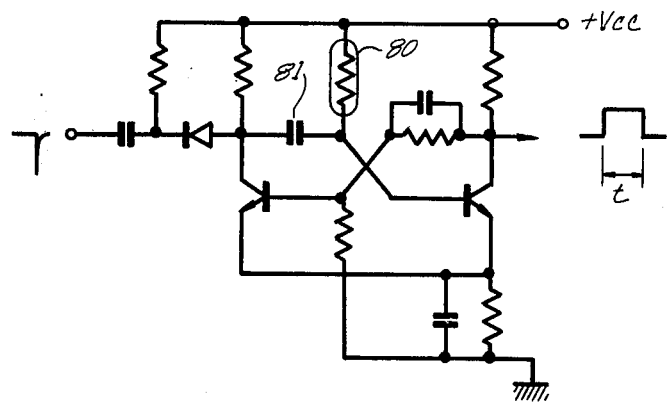
FIG. 10 is a schematic diagram of a photo-responsive monostable multivibrator used in embodiments of this invention.

Although photo-responsive pulse generator 31 having an oscillation frequency inversely proportional to exposure time is employed together with the timers (57 and 60, or 65) giving a predetermined time as means to generate pulses by the number according to the exposure time in the embodiments as illustrated by FIGS. 6 and 9, similar means may be constituted by a fixed oscillator and a timer adapted to give a time according to the exposure. In the embodiment of FIG. 7,. for example, an ordinary pulse oscillator such as a self-excitation multivibrator may be used in place of photo-responsive pulse generator 31, and monostable multivibrator 65 may be of the photo-responsive type as illustrated by FIG. 10. FIG. 10 illustrates a specific embodiment of the monostable multivibrator of well known art in which the resistance adapted to determine a pulse width is replaced by a CdS element. The width $t$ of the pulse generated by this oscillator is determined by a capacitor 81 and a CdS element 80 and is inversely proportional to the light intensity to which CdS element 80 is exposed. Reckoning of a preset diaphragm value and a film sensitivity may be effected by insertion of a variable resistor (not shown) in series or parallel to CdS element 80 or by varying the capacitance value of capacitor 81.

Figure 11:
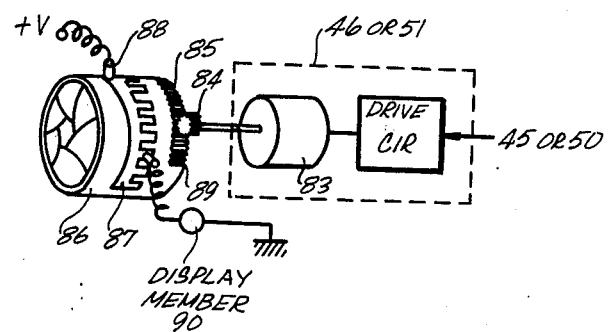
FIG. 11 is a block diagram schematically illustrating an arrangement providing for diaphragm adjustment.

FIG. 11 illustrates a specific embodiment of the arrangement such that the diaphragm is driven by diaphragm closing circuit 46 and diaphragm opening circuit 51. Diaphragm closing circuit 46 or diaphragm opening circuit 51 comprise a drive circuit 82 and a pulse motor 83. Reference numerals 84 and 85 designate gears which rotate a diaphragm ring 86 by a predetermined amount for every pitch rotation of pulse motor 83. Reference numeral 87 designates a contact piece in the form of comb teeth mounted around diaphragm ring 86 and energized with the voltage V through a fixed contact 88 which is normally in contact with contact piece 87. Reference numeral 89 designates another fixed contact which is in contact with the teeth portion of contact piece 87. Reference numeral 90 designates a display member as an electric lamp. In this arrangement, intermittent contact relationship is established between contact piece 87 of comb teeth form and fixed contact 89 during the rotation of diaphragm ring 86 by a predetermined angular distance. Thus the electric lamp 90 is also switched on and off, and, the rotation of the diaphragm ring may be visually observed. Contact piece 87, contacts 88 and 89, and electric lamp 90 may be provided as the case demands.

Figure 12:
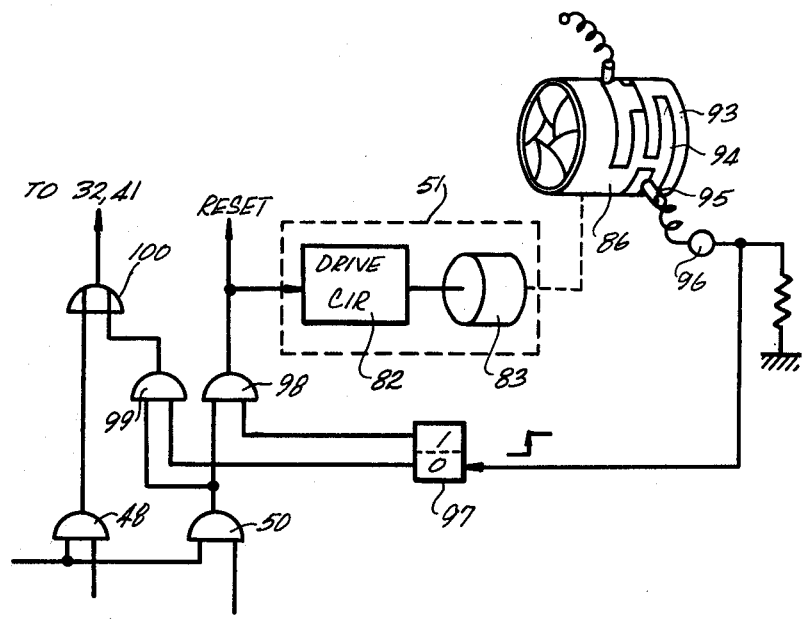
FIG. 12 is a block diagram schematically illustrating an arrangement provided for avoiding an unduly large diaphragm opening.

In the embodiments as previously mentioned, there is a danger of obtaining a fuzzy photograph due to an excessively shallow depth of field. This would result from excessively opening the diaphragm. As illustrated by FIG. 12, there is provided a circuit arrangement in which an important section adjacent diaphragm opening circuit 51 is shown to simplify illustration and the omitted portion will be understood in reference with FIG. 6 and the other figures. Referring to FIG. 12, reference numeral 86 designates a diaphragm ring adapted to be rotated by pulse motor 83. A switch contact 91 is provided on the outer periphery of diaphragm ring 86. Reference numeral 92 designates a fixed contact which is normally in contact with switch contact 91 and supplied with the voltage V. Reference numeral 93 designates a preset ring provided adjacent diaphragm ring 86 to set a tolerance limit of the diaphragm value. There is provided a switch contact 94 on outer periphery of ring 93 so as to be brought into contact with switch contact 91. Reference numeral 95 designates a fixed contact normally in contact with switch contact 94, and to contact 95 an electric lamp 96 is connected. Reference numeral 97 designates an RS flip-flop which is normally in the output condition as illustrated and reversed when applied through electric lamp 96 with a signal. Reference numeral 98 designates and AND gate through which "1" signal from AND gate 50 is applied to diaphragm opening circuit 51 when AND gate 98 is being applied with "1" signal from RS flip-flop. Reference numeral 99 designates an AND gate through which an OR gate 100 "1" signal from AND gate 50 is applied to thyristor 52 and the other elements when AND gate 99 is being applied with "1" signal from the RS flip-flop. The operator may set diaphragm ring 86 to a given value and set preset ring 93 also to a given value in consideration of various factors of photographing. Thus an actual operation of photographing is effected. When an exposure time stored in the decimal counter is out of a tolerance limit range as for the movement of the hands, AND gate 50 provides its output as previously mentioned and this output is applied through AND gate 98 to the decimal counter which is, in turn, reset and simultaneously diaphragm opening circuit 51 is activated. Ring 86 is thereby rotated by a predetermined amount. When there occurs no contact between switch contacts 91 and 94, electric lamp 96 also is not switched on and RS flip-flop 97 remains unchanged. Then, storage and discrimination are carried out again. When the exposure time stored is acceptable, AND gate 48 provides its output which is applied through OR gate 100 to the elments such as thyristor 52 and thereby the shutter is driven. When the stored exposure time is, on the contrary, out of the tolerance limit for movement of the hands, AND gate 50 provides its output and thereby diaphragm ring 86 is rotated again by a predetermined amount. As this rotation brings the switch contacts 91 and 94 into contact, electric lamp 96 is switched on and at the same time RS flip-flop is reversed. Now AND gate 98 is closed and AND gate 99 is opened. Storage and discrimination are effected here again and, when the stored exposure time is out of the tolerance limit for movement of the hands, AND gate 50 provides its output. This output is, however, applied not to the elements such as diaphragm opening circuit 51, but through AND gate 99 and OR gate 100 to the elements such as thyristor 52 to effect opening or closure of the shutter. It will be understood from the aforegoing description that an excessive opening of the diaphragm may be avoided by employing said circuit arrangement. Although there is still the danger of hand movement, such a danger will be indicated to the photographer by virtue of the switching on of the electric lamp 96 so that the photographer may avoid this danger.

Although the present invention as hereinabove described with respect to the various specific embodiments, many modifications in the details thereof are possible. For example, binary counters may be employed in place of the ring counter portions of the decimal counter so as to provide a binary-coded decimal counter. In such a case, a decode may be provided as the case demands. Furthermore, the construction of the discriminator is not limited to the specifically described embodiment and may be an optional arrangement comprising a combination of logic circuits. The present invention may be executed either with the fully opened photometric system or with the stopped down photometric system.

It will be obvious from the foregoing description that, according to the present invention, there is provided an arrangement such that the pulses of the number proportional to the exposure time are stored in the decimal digital memory means, so that the exposure time may be controlled with high precision and easily displayed in a decimal manner yet relatively few counter elements are required even when a ring counter or a shift counter is employed as the memory means. The decimal display may be achieved simply by provision of the display devices corresponding to the rexpective places of the counter serving to count the number of pulses corresponding to the exposure time. Depending on the type of the counter which constitutes the decimal digital memory means, a decoder may be required for the decimal display and, in such a case, the number of decoder elements is relatively few and both arrangement and circuit connection thereof also may be easily made. In a camera having a binary counter to which the information such as light intensity of an object to be photographed, a preset diaphragm value and a film sensitivity is applied and a digital system adapted to operate an exposure time on the basis of said information, the counter is of binary type while the input and output of the information as well as the display thereof are given in a decimal manner for a convenience to the operator inevitably resulting in the interface problems. These problems may be effectively eliminated by the present invention employing the decimal system.

Furthermore, in accordance with the present invention, storage, discrimination and diaphragm adjustment are repeated in an iterative process until the exposure time stored in the counter reaches an acceptable value and, when the acceptable value is reached, opening and closure of the shutter are automatically effected, so that unacceptable photographing due to factors such as overexposure and movement of the hands may be effectively avoided. The range of light intensity within which an acceptable photographing may be possible is thus enlarged. More specifically, a given diaphragm value otherwise would result in over-exposure and, therefore, in unacceptable photographing when the light intensity of an object to be photographed excesses, for example, 20 LV. According to the present invention, however, the diaphragm is automatically adjusted so that an acceptable photographing may be achieved even in such a case.

I claim:

1. Apparatus for automatically controlling a camera exposure operation, the apparatus comprising: means for generating data pulses by the number according to light intensity of an object to be photographed, preset diaphragm value and film sensitivity prior to opening of the camera shutter; digital memory means of decimal type adapted to be applied with and store the data pulses so as to accumulate a decimal count of the number of these data pulses, the digital memory means including a plurality of registers each for storing a respective one of unit and higher decimal place portions of the decimal count; discriminator means adapted to discriminate whether the decimal count stored in said decimal digital memory means is within a predetermined range or not after completion of the data pulse storage in said decimal digital memory means, being further adapted to output a shutter opening signal when said stored decimal count is within said predetermined range, and to output a diaphragm adjusting signal together with a reset signal for said digital memory means when said stored decimal count is out of said predetermined range; means adapted to be applied with the shutter opening signal from said discriminator means and thereby to open the shutter; timing-pulse generating means adapted to begin to apply timing pulses after opening of the shutter; shutter closing means adapted to be activated when the number of pulses generated by said timing-pulse generating means comes in a special relationship with the number of data pulses stored in said digital memory means; means adapted to adjust the diaphragm by a predetermined amount when applied with the diaphragm adjusting signal from said discriminator means, and wherein, when the diagphragm has been adjusted by said diaphragm adjusting means to a predetermined extent, said photo-responsive pulse generating means is activated again after the diaphragm has been stopped and thereby said storage and said discrimination are repeated.

* * * * *